(12) United States Patent  
Yamasaki et al.

(10) Patent No.: US 8,452,760 B2  
(45) Date of Patent: May 28, 2013

(54) RELEVANCY PRESENTATION APPARATUS, METHOD, AND PROGRAM

(75) Inventors: Tomohiro Yamasaki, Tokyo (JP); Masaru Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/357,637

(22) Filed: Jan. 25, 2012

(65) Prior Publication Data

US 2012/0185466 A1  Jul. 19, 2012

Related U.S. Application Data

(63) Continuation of application No. PCT/JP2009/063366, filed on Jul. 27, 2009.

(51) Int. Cl.  
*G06F 17/30* (2006.01)

(52) U.S. Cl.  
USPC ............ 707/722; 707/739; 707/755; 707/756

(58) Field of Classification Search  
USPC ............... 707/722, 749, 758, 740, 711, 713, 707/730, 738, 739, 755, 756  
See application file for complete search history.

(56) References Cited

U.S. PATENT DOCUMENTS

| | | | |
|---|---|---|---|
| 7,496,561 B2* | 2/2009 | Caudill et al. ....................... 1/1 |
| 7,831,588 B2* | 11/2010 | Jones et al. ..................... 707/713 |
| 7,917,519 B2* | 3/2011 | Kimbrough et al. .......... 707/749 |
| 8,036,876 B2* | 10/2011 | Sanfilippo et al. ............... 704/9 |
| 2002/0129015 A1* | 9/2002 | Caudill et al. .................... 707/6 |
| 2004/0111408 A1* | 6/2004 | Caudill et al. .................... 707/3 |
| 2007/0106493 A1* | 5/2007 | Sanfilippo et al. ............... 704/9 |
| 2007/0106662 A1* | 5/2007 | Kimbrough et al. .............. 707/5 |
| 2009/0254540 A1* | 10/2009 | Musgrove et al. ................ 707/5 |
| 2010/0017390 A1 | 1/2010 | Yamasaki et al. |
| 2011/0004588 A1* | 1/2011 | Leitersdorf et al. .......... 707/711 |
| 2011/0314032 A1* | 12/2011 | Bennett et al. ................ 707/749 |

FOREIGN PATENT DOCUMENTS

| | | | |
|---|---|---|---|
| JP | 2002-108937 A | 4/2002 |
| JP | 2003-108597 A | 4/2003 |
| JP | 2006-338508 A | 12/2006 |
| JP | 2008-152634 A | 7/2008 |

OTHER PUBLICATIONS

International Search Report dated Aug. 25, 2009 from PCT/JP2009/063366.  
Kikuchi, et al.; "Extraction of Topic Transition Through Time Series Document Based on Hierarchical Clustering"; Journal of the DBSJ; vol. 7, No. 1; Jun. 2008, 8 pages.  
Sato, et al.; "Latest Topic Words Detection from Chronological News Stream"; Jul. 22, 2005; IPSJ SIG Technical Reports, 11 pages.

\* cited by examiner

*Primary Examiner* — Jean M Corrielus  
(74) *Attorney, Agent, or Firm* — Ohlandt, Greeley, Ruggiero and Perle, L.L.P.

(57) ABSTRACT

According to one embodiment, a relevancy presentation apparatus includes a storage, an extraction unit, a first expansion unit, a second expansion unit, a determination unit and a generation unit. The storage stores topic networks. The extraction unit extracts subject keywords. The first expansion unit acquires first relevant words from the topic networks. The second expansion unit searches an ontologies for the subject keywords. The determination unit extracts common relevant words, and determines whether frequencies of appearances of relevant words are stationary. The generation unit generates search queries based on whether the frequencies of appearances are stationary, and generates search results.

15 Claims, 11 Drawing Sheets

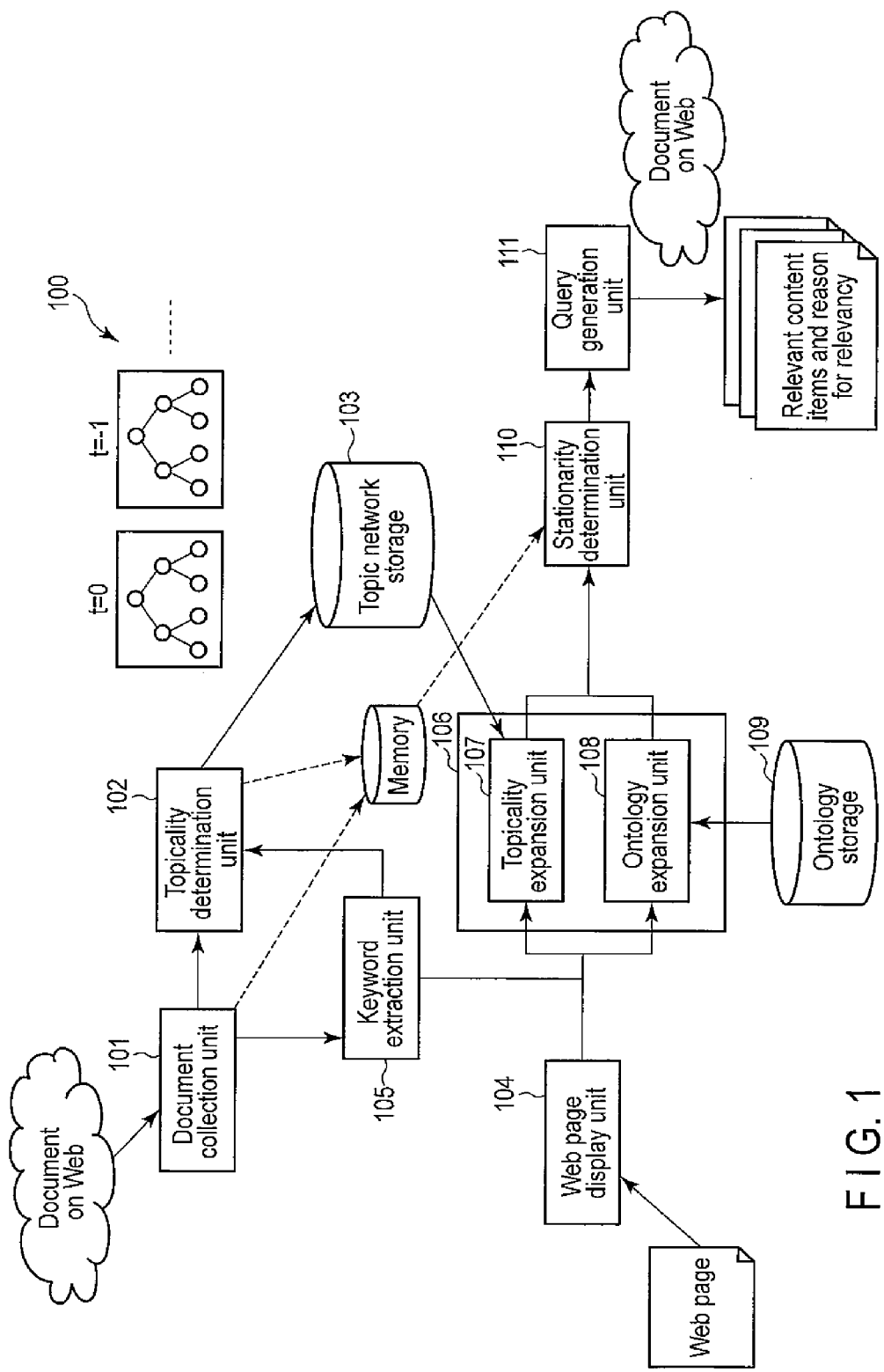
F I G. 1

| Delivery source URL | Type | Collection interval |
|---|---|---|
| http://aaa | EPG (Terrestrial digital) | 1 day |
| http://bbb | RSS (News) | 1 hour |
| http://ccc | RSS (Travel) | 1 week |
| http://ddd | EPG (BS) | 1 week |
| http://eee | RSS (Culture) | 1 month |
| ........ | ........ | ........ |

F I G. 2

| Delivery source URL | Date and time of processing | Topic network |
|---|---|---|
| http://aaa | 2009/01/22 00:00:00 | Grand sale / N.Y. / L.A. / Theft |
| http://bbb | 2009/01/21 00:00:00 | (topic network) |
| http://aaa | 2009/01/21 00:00:00 | Illumination / L.A. / Detroit / Ramen |

FIG. 3

| Dictionary entry | Semantic attribute |
|---|---|
| Iguana | Animal, reptile |
| Flammulina veluptipes | Plant, fungi |
| Big name | Mouthy |
| Singer | Stature, occupation |
| ---------- | ---------- |

FIG. 6

| Rule entry | Semantic attribute |
|---|---|
| Mrs. ○○, Mr. ○○ | Person |
| ○○ prefecture, ○○ city | Place name, American city |
| ○○ disease | Health, disease name |
| ---------- | ---------- |

FIG. 7

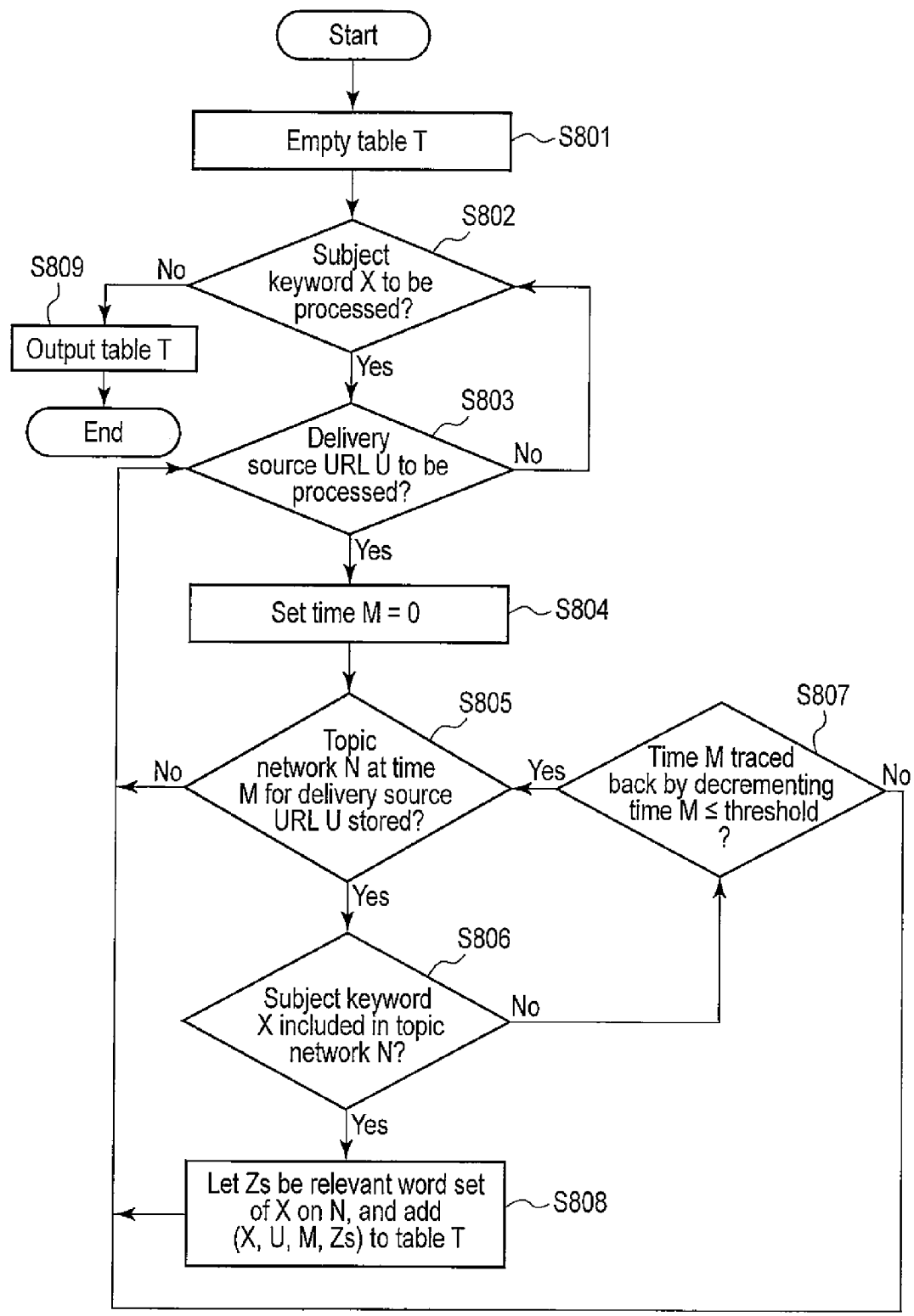
F I G. 8

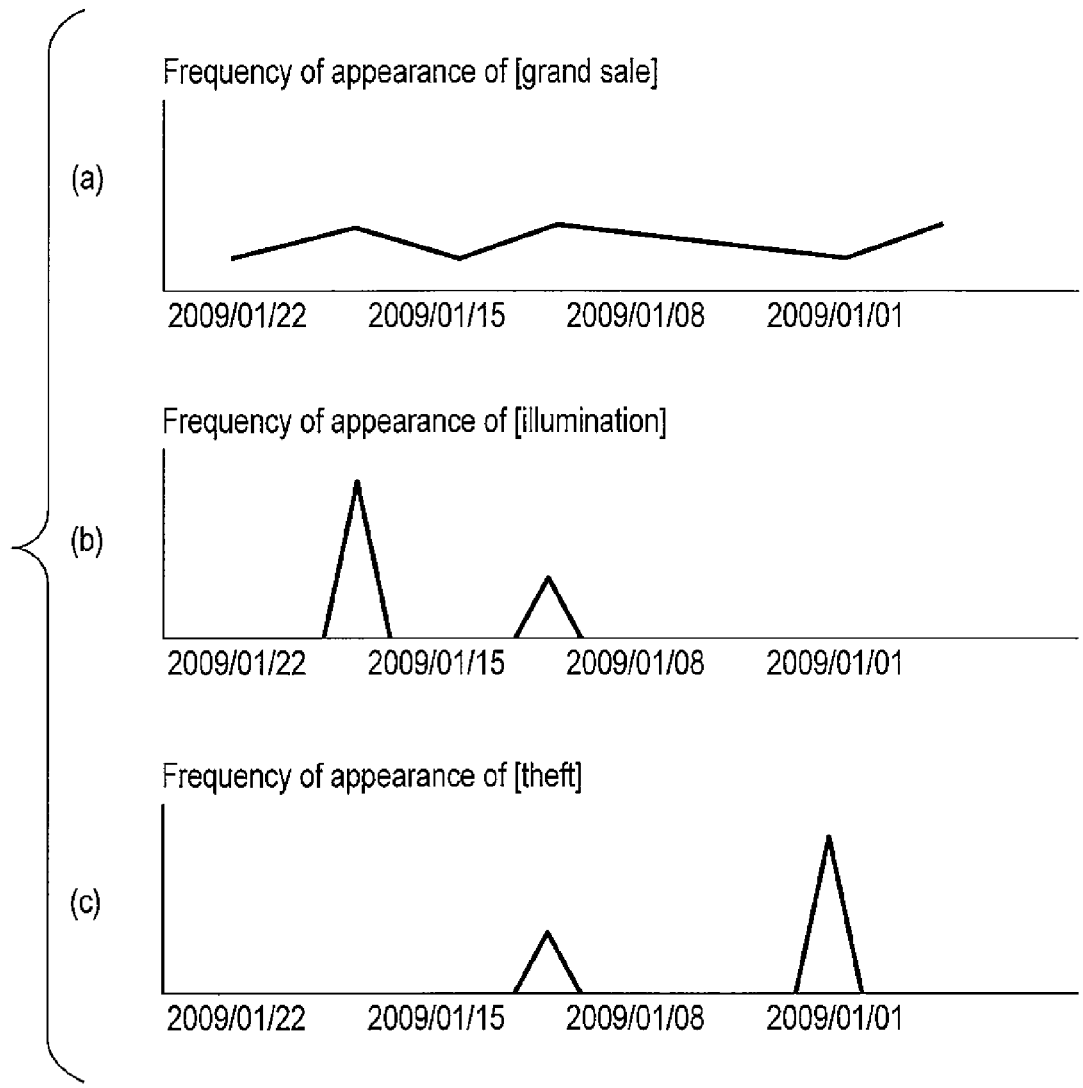
F I G. 12

RELEVANCY PRESENTATION APPARATUS, METHOD, AND PROGRAM

CROSS REFERENCE TO RELATED APPLICATIONS

This application is a Continuation Application of PCT Application No. PCT/JP2009/063366, filed Jul. 27, 2009, the entire contents of which are incorporated herein by reference.

FIELD

Embodiments described herein relate generally to a relevancy presentation apparatus, method, and program.

BACKGROUND

In content items recommendations, in order to realize content items recommendations which present not only a content item which matches the user's interest but also broaden the user's interest, query expansion for a subject keyword is performed using an associative network between keywords so as to search for relevant content items (See, e.g., JP-A. No. 2008-152634 (KOKAI)).

BRIEF DESCRIPTION OF THE DRAWINGS

FIG. 1 is a block diagram showing a relevancy presentation apparatus according to a present embodiment.

FIG. 2 is a table illustrating an example of settings of document collection sources.

FIG. 3 is a table illustrating an example of topic networks stored in a topic network storage.

FIG. 6 is a table illustrating an example of a semantic attribute dictionary used in keyword extraction processing of a keyword extraction unit.

FIG. 7 is a table illustrating an example of semantic attribute rules used in the keyword extraction processing of the keyword extraction unit.

FIG. 8 is a flowchart illustrating an example of an operation of a topicality expansion unit.

FIG. 12 illustrates frequency distributions of appearance of relevant words.

DETAILED DESCRIPTION

Figure 4:
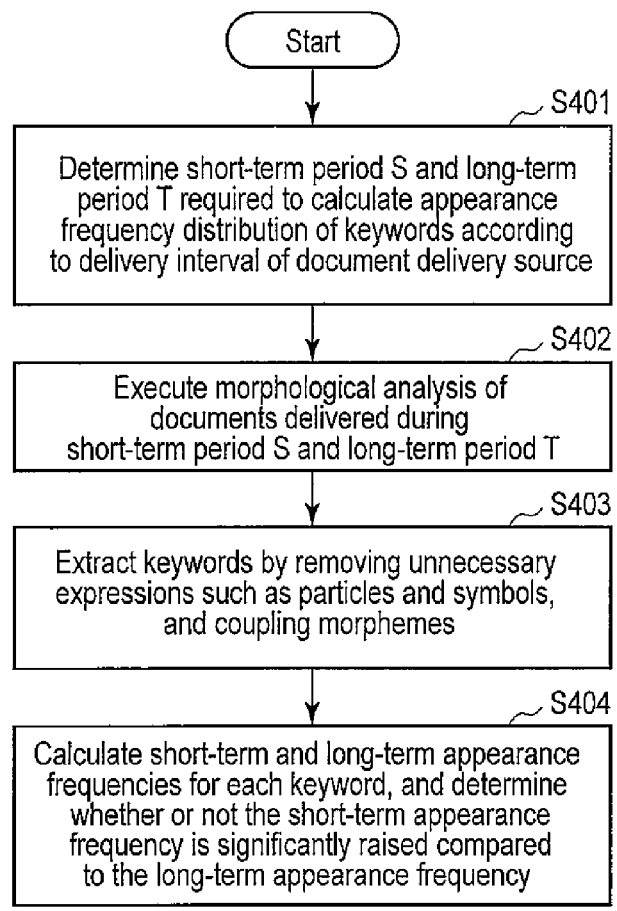
FIG. 4 is a flowchart illustrating an example of an operation of a topicality determination unit.

An ontology is popularly used as an associative network between keywords. However, when the ontology is used as the associative network, and when there are a large number of relevant words for an association source word, it is difficult to judge which words are to be selected as association destination words. Even when words are selected by an arbitrary means, association destination words for an association source word seem to be unrelated for the user. On the other hand, a network of keywords which constitutes topics at a certain timing is established by considering huge quantities of information on the network as collective intelligence in terms of widely knowing topics in the world, and classifying frequent keywords based on the topicalities. The network of keywords is also referred to as a topic network. When the topic network is used as the associative network, content items which are relevant but have no direct semantic connections can be searched for, unlike in the ontology. However, only a current or immediately preceding topic network includes insufficient keywords, and content items to be retrieved are limited to disturb query expansion for a subject keyword. When a previous topic network is used, even content items which have older dates of creation and poor relevancies from a current subject are retrieved, and it is difficult for the user to take an interest in recommended content items.

In general, according to one embodiment, a relevancy presentation apparatus includes a first storage, a second storage, an extraction unit, a first expansion unit, a second expansion unit, a first determination unit and a generation unit. The first storage is configured to store a plurality of topic networks obtained by clustering first keywords related to topics based on a co-occurrence relation between the first keywords. The second storage is configured to store at least one ontology indicating a network which hierarchically represents conceptual connections between second keywords and upper layers of which correspond to broader concepts, the second keywords indicating first nodes in the network. The extraction unit is configured to extract, from one or more documents, one or more subject keywords each indicating a topic of a first content item, the documents each comprising at least one first content item, the subject keywords being included in the topic networks. The first expansion unit is configured to acquire one or more first relevant words from the topic networks, the first relevant words indicating third keywords other than the subject keywords. The second expansion unit is configured to search the ontology for the subject keywords, and, if the subject keywords are thereby found, to acquire in turn from successively higher layers, beginning with a first layer comprising the subject keywords, second nodes in each layer until the number of acquired second nodes has exceeded or reached a first threshold. The first determination unit is configured to extract common relevant words indicating that the first relevant words and the acquired second nodes are common, and to determine whether or not frequencies of appearances of second relevant words are stationary, the second relevant words indicating fourth keywords which fail to be included in the acquired second nodes among the first keywords of the topic networks including the common relevant words. The generation unit is configured to generate search queries based on whether or not the frequencies of appearances are stationary, and to generate search results of second content items and a reason for a relevancy of the second content items.

The relevancy presentation apparatus, method, and program according to the embodiment will be explained with reference to the drawings. In the embodiment below, like reference numbers denote like elements, and no duplicate descriptions will be given.

The arrangement of a relevancy presentation apparatus according to this embodiment will be described in detail below with reference to FIG. 1.

A relevancy presentation apparatus 100 according to this embodiment includes a document collection unit 101, topicality determination unit 102, topic network storage 103, web page display unit 104, keyword extraction unit 105, keyword expansion unit 106, ontology storage 109, stationarity determination unit 110, and query generation unit 111. Furthermore, the keyword expansion unit 106 includes a topicality expansion unit 107 and ontology expansion unit 108.

The document collection unit 101 collects documents having date and time information for the purpose of creation of topic networks. The topic network is that of a tree structure indicating connections of keywords which constitute topics at a certain timing. Since only one topic network normally includes insufficient keywords, topic networks are created in correspondence with viewpoints. For this purpose, it is desirable to use a plurality of collection sources which are delivered periodically such as electronic program guide (EPG) data which are delivered daily to be superposed on a television broadcast image itself, RSS data which are delivered at intervals of several hours by news sites on the Web, and the like. A collection interval can be one day for the EPG data since its delivery interval is one day. However, in case of the RSS data, since the delivery intervals are different for respective sites, the collection intervals are set for respective collection sources.

An example of delivery source URLs, types, and collection intervals of documents collected by the document collection unit 101 will be described in detail below with reference to FIG. 2. A delivery source URL 201 indicates a URL where documents are saved. A type 202 indicate a data type of a document collection source such as EPG and RSS described above, and further includes a type of document content items included in each data type. The types of the document content items include, for example, "news", "sports", and "culture", or "terrestrial digital" and "BS (broadcasting satellite)". A collection interval 203 is a time interval for acquiring documents from each delivery source URL 201. The document collection unit 101 has a table associated with document collection, as shown in FIG. 2, and collects documents in synchronism with collection intervals with reference to this table. In the example shown in FIG. 2, the document collection unit 101 is set to collect documents, that is, to collect EPG data once per day from a delivery source URL 201 "http://aaa", to collect RSS data associated with news once per hour from a URL "http://bbb", to collect RSS data associated with travels once per week from a delivery source URL 201 "http://ccc". The document collection unit 101 may store the delivery source URLs 201 and documents acquired from these URLs in an external memory in association with each other.

The topicality determination unit 102 receives the delivery source URLs and the collection intervals from the document collection unit 101, receives keywords from the keyword extraction unit 105 (to be described later), calculates frequency distributions of appearance of the keywords (words or complex words) in documents for respective dates and times, and performs topicality determination processing as to whether or not each keyword has a topicality. A plurality of topic networks are generated by clustering keywords determined by the topicality determination processing to have topicalities based on co-appearance relations. Note that a co-appearance relation indicates appearance of a plurality of words in a single document, and "words A and B have a co-appearance relation" indicates that words A and B appear in a single document. The topicality determination processing in the topicality determination unit 102 will be described in detail later with reference to FIG. 4. Also, the topicality determination unit 102 may store keywords and delivery source URLs, which have undergone the topicality determination processing, in the external memory in association with the delivery source URLs and documents stored by the document collection unit 101. That is, the external memory stores the keywords, delivery source URLs, and documents in association with each other. Note that the topicality determination unit 102 may receive the delivery source URLs and the collection intervals from the keyword extraction unit 105 in place of receiving them from the document collection unit 101.

The topic network storage 103 receives a plurality of topic networks generated at a certain timing and the delivery source URL from the topicality determination unit 102, and stores topic networks generated for a certain delivery source URL in association with a date and time of generation processing of those topic networks.

An example of topic networks to be stored will be described below with reference to FIG. 3. As shown in FIG. 3, a date and time of generation processing 301 of a topic network 302 and a topic network 302 are stored in association with a certain delivery source URL 201. Also, a plurality of topic networks may often be generated at a certain date and time of processing 301. For example, only one topic network 302 is generated at a date and time of processing 301 "2009/01/22 00:00:00" of documents collected from the delivery source URL 201 "http://aaa", but two topic networks 302 are generated at a date and time of processing 301 "2009/01/21 00:00:00" of documents collected from the delivery source URL 201 "http://bbb". In this way, all topic networks 302 generated at respective timings are stored.

The web page display unit 104 displays a content item on a web page, when the user browses a desired content item.

The keyword extraction unit 105 extracts keywords by performing, for example, morphological analysis of texts included in documents collected by the document collection unit 101, and sends the extracted keywords to the topicality determination unit 102. Also, every time the user browses a content item, the keyword extraction unit 105 acquires subject keywords as topics of the content item from the content item displayed on the web display unit 104 to obtain a subject keyword set including one or more subject keywords, and sends the subject keyword set to the keyword expansion unit 106. Subject keyword extraction processing in the keyword extraction unit 105 will be described later with reference to FIGS. 6 and 7.

The keyword expansion unit 106 receives the subject keyword set from the keyword extraction unit 105, and performs expansion processing of relevant words as words relevant to the subject keywords by the topicality expansion unit 107 and ontology expansion unit 108 included in itself. Then, the topicality expansion unit 107 and ontology expansion unit 108 respectively generate relevant word sets. The operation of the keyword expansion unit 106, that is, the relevant word expansion processing in the topicality expansion unit 107 and ontology expansion unit 108 will be described in detail later with reference to FIGS. 8, 9, and 10.

The ontology storage 109 stores ontologies including various keywords, and sends stored ontologies to the ontology expansion unit 108 in response to a request from the ontology expansion unit 108. An ontology expresses conceptual connections between keywords. The stored ontologies may be one giant network including all concepts, and also may be a plurality of networks divided for respective categories.

The stationarity determination unit 110 obtains common parts of the relevant word sets which are received from the keyword expansion unit 106 and are respectively generated by the topicality expansion unit 107 and ontology expansion unit 108, and determines whether or not common relevant words are stationary. The stationarity determination processing will be described in detail later with reference to FIG. 11.

The query generation unit 111 receives common relevant words whose stationarities are determined from the stationarity determination unit 110, generates a query required to present relevant words to the user, and searches for content items using the generated query. Based on the query search result, the query generation unit 111 generates text indicating a reason for a relevancy. The query generation processing in the query generation unit 111 will be described in detail later with reference to FIG. 13.

The topicality determination processing in the topicality determination unit 102 and keyword extraction unit 105 will be described in detail below with reference to the flowchart shown in FIG. 4.

Initially, in step S401, the keyword extraction unit 105 decides a short term period S and long term period L required to calculate frequency distributions of appearance of keywords in step S404 later in accordance with delivery intervals of document delivery sources. The delivery intervals are obtained with reference to the collection intervals 203 of the table shown in FIG. 2, which is stored in the document collection unit 101. For example, in the example shown in FIG. 2, since EPG data is acquired once per day from the URL "http://aaa", the short term period S is set to be three days, and the long term period L is set to be seven days.

In step S402, the keyword extraction unit 105 performs morphological analysis of documents delivered during the short term period S and long term period L. Since the morphological analysis can use a general method, a detailed description thereof will not be given.

In step S403, the keyword extraction unit 105 extracts keywords by removing unnecessary expressions such as particles and symbols, and coupling morphemes.

Finally, in step S404, the topicality determination unit 102 performs topicality determination as to whether or not each keyword is topical by calculating frequencies of appearance in the short term period S and those in the long term period L for respective keywords, and determining whether or not short term frequencies of appearance are significantly raised compared to long term frequencies of appearance. As an example of this determination, assuming that the long term frequencies of appearance conform to a uniform distribution, a null hypothesis "short term frequencies of appearance also conform to a uniform distribution having the same average" is tested to determine whether or not each keyword is topical. More specifically, letting N(L) be long term frequencies of appearance, short term frequencies of appearance N(S) conform to a probability distribution $_{N(L)}C_{N(S)} (S/L)^{N(S)} (1-S/L)^{N(L)-N(S)}$. A Z-test is performed by checking whether or not a Z-value of the actually observed short term frequencies of appearance is larger than a threshold, thereby determining a topicality. Since delivery intervals and document tendencies are different depending on collection sources, it is desirable to perform determination for each collection source. However, all documents may undergo determination together.

With this processing, when the Z-value of the short term frequencies of appearance is larger than the threshold, it is determined that a keyword has a topicality, and that keyword is extracted as a topical keyword since it is a topic that is currently gathering stream, thus performing subsequent processing. When the Z-value of the short term frequencies of appearance is less than or equal to the threshold, it is determined that a keyword does not have any topicality, thus skipping the subsequent processing. In this way, the topicality determination processing ends. Also, this keyword with the topicality is called a topical keyword.

For a set of topical keywords extracted in this way, the topicality determination unit 102 calculates conditional probabilities of appearance between all the topical keywords. For example, for certain topical keywords KW1 and KW2, let N(KW1) and N(KW2) be the numbers of documents in which these topical keywords respectively appear, and N(KW1, KW2) be the number of documents in which KW1 and KW2 appear in a single document. At this time, a conditional probability of appearance of KW2 with respect to KW1 is P(KW2|KW1)=P(KW1, KW2)/P(KW1)=N(KW1, KW2)/N(KW1). If all topical keywords are set as apexes, and a directed edge is drawn between topical keywords when a conditional probability of appearance is larger than a threshold a which is set advance, a co-appearance relation graph between topical keywords can be generated.

Next, the topicality determination unit 102 performs hierarchical clustering which combines keywords having high degrees of relevance in turn to form new groups based on the generated co-appearance relation graph. At this time, a degree of relevance may use a sum of conditional probabilities when there are directed edges in two directions, and may use a product of a conditional probability with an appropriate coefficient when there is a directed edge in only one direction. The hierarchical clustering method can be performed in, for example, the following sequence.

1. A cluster having the number of elements=1, that is, a cluster including each individual keyword is generated for each of respective topical keywords of the co-appearance relation graph.

2. Topical keywords KW1 and KW2 having a highest degree of relevance are calculated.

3. The degree of relevance between KW1 and KW2 is compared with a certain threshold. When the degree of relevance between KW1 and KW2 is less than or equal to the threshold, it is determined that there are no clusters to be combined into one cluster, thus ending the clustering. When the degree of relevance between KW1 and KW2 is larger than the threshold, a cluster of a new feature vector C=A+B including feature vectors A and B is generated, and the two original clusters are deleted.

4. For a cluster set from which the clusters of the feature vectors A and B are deleted, and the cluster of the feature vector C is added, calculation processing of clusters having a highest degree of relevance is repeated.

With the above processing, the hierarchical clustering can be performed. Note that the clustering execution timing can be determined according to the delivery intervals of documents. In the example of FIG. 2, the topicality determination unit 102 sets, for example, a clustering execution interval to be once per day for the URL "http://aaa" as the delivery source URL 201 since the collection interval 203 is once per day. Also, in the hierarchical clustering, a topic network including only one cluster may be generated depending on keywords.

Figure 5:
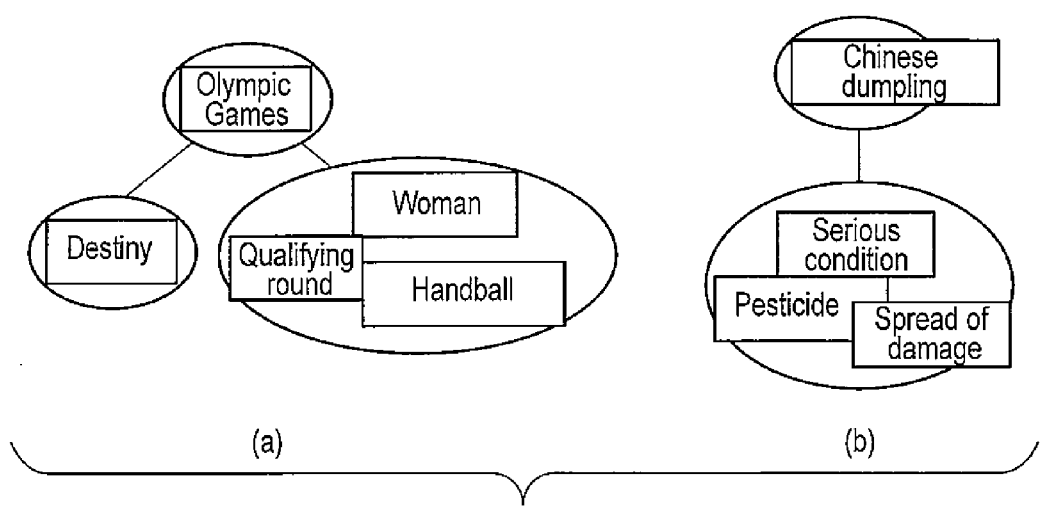
FIG. 5 illustrates examples of topic networks.

FIG. 5 partially shows topic networks, which are expressed in a tree format, at a certain timing of the hierarchical clustering. In (a), low-order keywords "woman", "destiny", "qualifying round", and "handball" are hierarchically connected to a high order keyword "Olympic Games", and in (b), low-order keywords "serious condition", "pesticide", and "spread of damage" are hierarchically connected to a high order keyword "Chinese dumpling", thus generating the hierarchical clustering.

The subject keyword set extraction processing in the keyword extraction unit 105 will be described below with reference to FIGS. 6 and 7. A subject keyword set is a set of keywords relevant to a topic of a content item browsed by the user.

The subject keyword set extraction processing is performed every time the user browses a content item. Portions such as a header, footer, ads, links, and the like, which are not subjects of a content item, are deleted from the content item browsed by the user, and a portion which occupies a large area on a screen and is important in terms of a layout is extracted, thereby extracting subject text. When topics are not focused into one in a content item like in a very long content item, the extracted text is divided into paragraphs to extract subject text parts for respective topics. After that, for each subject text, keywords such as fixed expressions such as amounts of money and times, proper nouns such as personal names and place names, and categories such as things of food, and animal and plant names are extracted as subject keywords. Then, all possible subject keywords are extracted from each subject text to generate a subject keyword set including semantic attributes of the extracted subject keywords. The subject keyword set extraction processing may be performed by matching keywords with a dictionary which is given in advance, as shown in FIG. 6. For example, when a subject keyword "iguana" is extracted, a semantic attribute "animal, reptile" of "iguana" is extracted together. This semantic attribute is used upon selection of a class of a concept from the ontology storage 109, as will be described later. Alternatively, as shown in FIG. 7, the extraction processing may be performed by matching with rules of an order of arrangement of character strings or that of morphemes, which are given in advance. For example, when a subject keyword "New York city" is extracted, an entry rule of "New York city" is ". . . city", and its semantic attribute "place name, American city" is extracted together. This semantic attribute is used upon selection of a class of a concept from the ontology storage 109 as in FIG. 6.

The relevant word expansion processing in the topicality expansion unit 107 will be described in detail below with reference to the flowchart shown in FIG. 8. In this processing, a subject keyword X is acquired one by one, and whether or not that subject keyword is included is determined by tracing back, one by one, topic networks N stored in the topic network storage 103 in turn from the current one.

Initially, in step S801, a table T which stores an association [subject keyword, delivery source URL, time, relevant word set] is initialized.

Next, it is determined in step S802 whether or not subject keywords X to be processed still remain. If the subject keywords X to be processed still remain, one subject keyword X is acquired from the keyword extraction unit 105, and the process proceeds to next step S803. If no subject keyword X to be processed remains, the process proceeds to step S809.

Subsequently, it is determined in step S803 whether or not delivery source URLs U to be processed still remain for the subject keyword X to be processed. If the delivery source URLs U to be processed still remain, the process proceeds to step S804. If no delivery source URL U to be processed remains, the process returns to step S802 to repeat processing for the next subject keyword X.

In step S804, for the delivery source URL U to be processed, a latest date and time of processing upon execution of the generation processing of topic networks stored in the topic network storage 103 is expressed by a time M=0; a date and time of processing Q times older than the latest date and time of processing is expressed by M=−Q. More specifically, for example, in FIG. 3, a date and time of processing "2009/1/22 00:00:00" corresponds to the time M=0, and a date and time of processing "2009/1/21 00:00:00" as a stored date and time one day older than the latest date and time corresponds to a time M=−1. That is, an interval of times M is one day in this case.

It is determined in step S805 for the delivery source URL U of interest whether or not the topic network storage 103 stores a topic network N at the time M. That is, if the processing in step S805 is that for the first time, it is determined whether or not a topic network N at the current time (M=0) is stored. If the topic network N at the current time is stored, the process proceeds to step S806. If no topic network N at the current time is stored, the process returns to step S803 to determine whether or not delivery source URLs to be processed still remain for the subject keyword X of interest.

It is determined in step S806 whether or not the topic network N at the time M includes the subject keyword X of interest. If the processing in step S806 is that for the first time, it is determined whether or not the topic network N at the current time includes the subject keyword X. If the subject keyword X is included, the process proceeds to step S808. If no subject keyword X is included, the process proceeds to step S807.

In step S807, the time M is decremented by one to trace back the date and time of processing to that one day older, and it is determined whether or not the traced back time M is less than or equal to a threshold. If the traced back time M is less than or equal to the threshold, the process returns to step S805 again to repeat the same processes in steps S805 and S806 for the topic network N one day older. If the traced back time M is not less than or equal to the threshold (for example, if no subject keyword X is included even when the date and time of processing is traced back to certain M), the process returns to step S803 to determine whether or not another delivery source URL to be processed is available for that subject keyword X. The threshold limits, for example, a range to be traced back, and may target all networks stored in the topic network storage 103 or may set a period of dates and times of processing to be determined such as one year ago. Further, the process may be performed until the subject keyword is found.

In step S808, a plurality of keywords included in the topic network N to which the subject keyword X belongs are set as a relevant word set Zs, and [subject keyword X, delivery source URL U, time M, and relevant word set Zs] is added to the table T. Then, the processes in steps S803 to S808 are repeated. Note that all keywords included in the topic network N may be extracted as the relevant word set Zs or keywords which are included in a cluster including the subject keyword X to a cluster of a predetermined layer (for example, the third layer) may be extracted.

In step S809, when the processing is complete for all the subject keywords X, the table T which associates the subject keywords X, delivery source URLs U, times M, and relevant keyword sets Zs with each other is output, thus ending the relevant word expansion processing.

Note that at this time, when all documents are created together, the topic networks N may be simply traced back one by one. In this case, topic networks N corresponding to different delivery source URLs are separately traced back. For example, in the example shown in FIG. 3, when a subject keyword X "L.A." is obtained from a content item browsed by the user on 2009/01/22, "grand sale", "N.Y.", "theft", and the like are expanded as relevant words for a date and time of creation 2009/01/22 00:00, and "Detroit", "illumination", "ramen", and the like are expanded as relevant words for a date and time of creation 2009/01/21 00:00.

Figure 9:
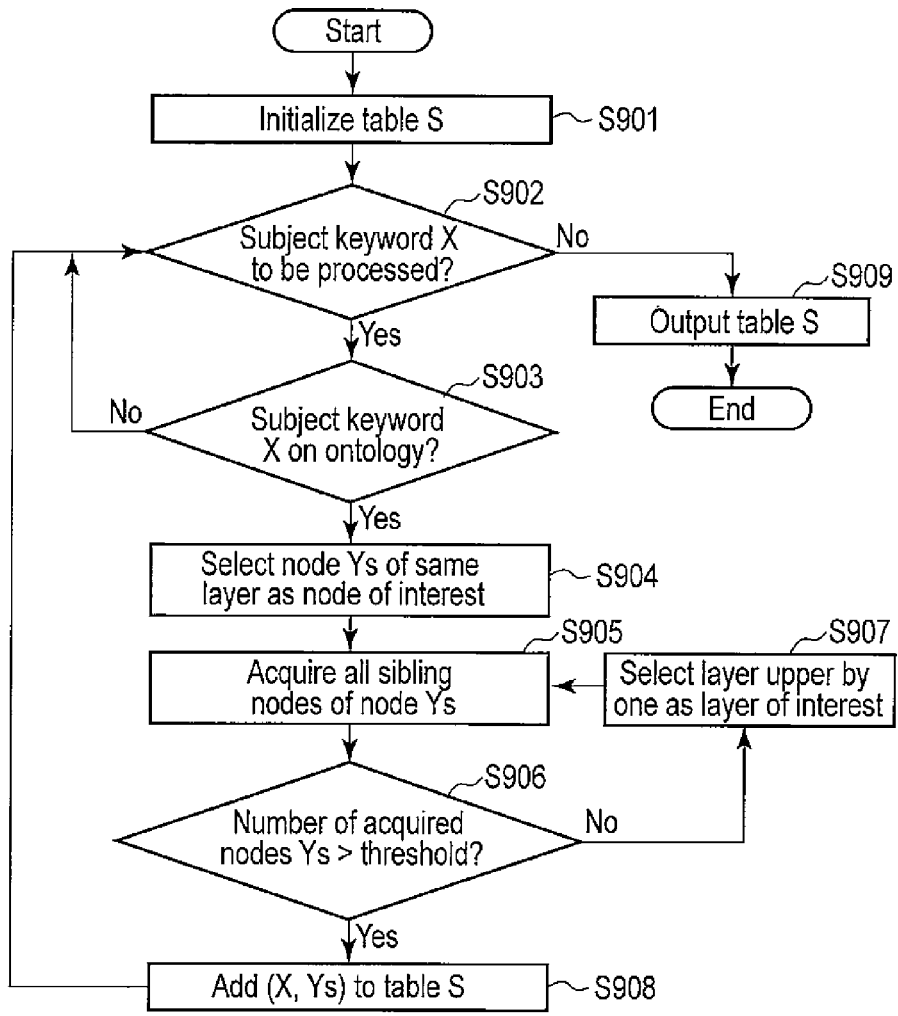
FIG. 9 is a flowchart illustrating an example of an operation of an ontology expansion unit.

The relevant word expansion processing in the ontology expansion unit 108 will be described in detail below with reference to the flowchart shown in FIG. 9.

Initially, in step S901, a table S used to hold [subject keyword, relevant word set] is initialized.

It is then determined in step S902 whether or not subject keywords X to be processed still remain. If subject keywords X to be processed still remain, one of the subject keywords X is acquired from the keyword extraction unit 105, and the process proceeds to step S903. If no subject keyword X remains, the process proceeds to step S909.

Subsequently, it is determined in step S903 whether or not the subject keyword X is found on an ontology stored in the ontology storage 109. This determination process may be attained by either perfect matching as a character string or ambiguous matching. If the ontology includes a plurality of networks, the determination process is applied to the respective networks. As a result of this determination process, if the subject keyword X is found on the ontology, the process proceeds to step S904. If the subject keyword X is not found on the ontology, the process returns to step S902 to repeat the processing.

In step S904, a node Ys of the same layer, that is, the node Ys as a sibling node is selected as a node of interest. In this case, the node Ys represents one keyword, and is used as a relevant word for the subject keyword.

In step S905, all the nodes Ys as sibling nodes are acquired from the ontology storage 109. In this case, as for a node having lower layers of these sibling nodes, all the lower layers of that node are acquired. By acquiring all the sibling nodes, a parent node upper by one layer is substantially acquired.

It is determined in step S906 whether or not the number of acquired nodes Ys is larger than a threshold. If the number of nodes Ys is larger than the threshold, the process proceeds to step S908. If the number of nodes Ys is less than or equal to the threshold, the process proceeds to step S907 to select a layer upper by one layer than the node Ys of interest as a layer of interest. Then, the process returns to step S905 to repeat the same processing. More specifically, in case of FIG. 10(a), a range of the node Ys is expanded like "player of T team→baseball player→athlete" until the threshold which is given in advance is exceeded.

In step S908, [subject keyword X, nodes Ys] is added to the table S in association with each other. That is, the plurality of nodes Ys are associated with the subject keyword X, and they correspond to a relevant word set in the topicality expansion unit 107. Then, the process returns to step S902 to similarly repeat the processes in steps S902 to S908.

Finally, in step S909, the table S which associates the subject keywords X and nodes Ys is output, thus ending the relevant word expansion processing.

Figure 10:
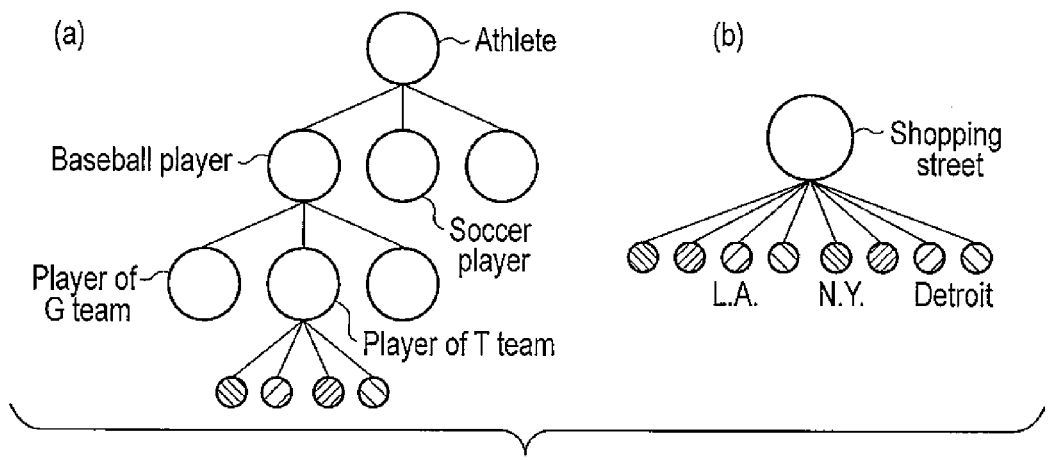
FIG. 10 is a view illustrating ontologies stored in an ontology storage.

An example of the ontology stored in the ontology storage 109 will be described below with reference to FIG. 10. In case of an ontology having a sturdy hierarchical structure, as shown in FIG. 10(a), since neighboring nodes are limited to small numbers, appropriate query expansion with visible relevancies for the user can be attained. On the other hand, in case of an ontology which has nearly no hierarchical structure and includes a large number of sibling nodes, as shown in FIG. 10(b), their relevancies are often difficult to be visible. In such case, processing according to this embodiment has to be applied. By obtaining common parts between relevant words extracted from the ontology expansion unit 108 and topicality expansion unit 107, relevancies are allowed to be visible even when there are a large number of sibling nodes.

Figure 11:
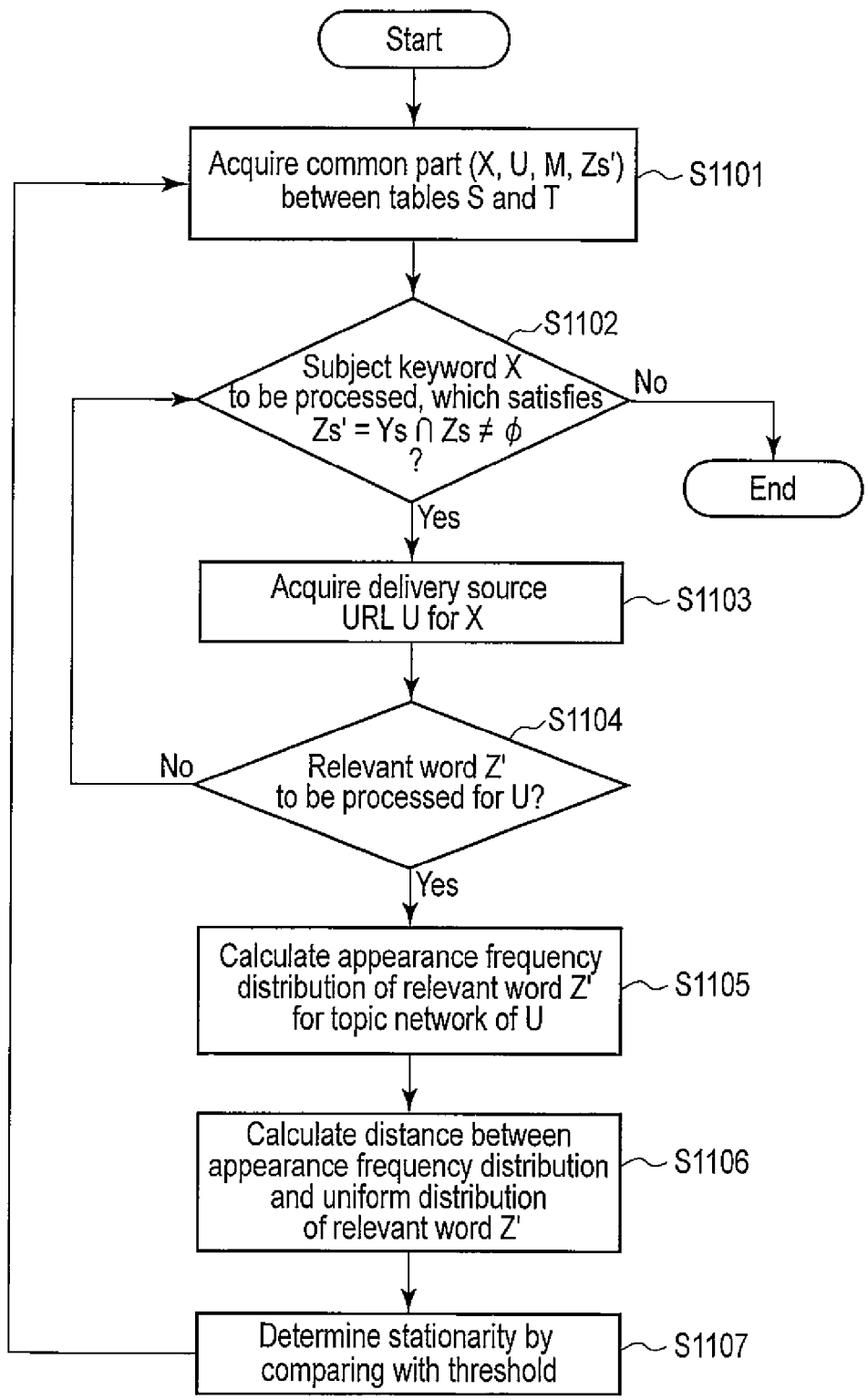
FIG. 11 is a flowchart illustrating an example of an operation of a stationarity determination unit.

The stationarity determination processing of relevant words in the stationarity determination unit 110 will be described in detail below with reference to the flowchart shown in FIG. 11.

Initially, in step S1101, since the relevant word sets for the subject keywords have already been obtained in the tables T and S by the aforementioned topic network expansion processing in the topicality expansion unit 107 and the ontology expansion processing in the ontology expansion unit 108, the subject keyword X is acquired one by one to acquire common relevant words Zs' as common parts between the relevant word sets of the tables T and S. For example, when a subject keyword "L.A." is obtained from a content item browsed by the user on 2009/01/22, shopping street names such as "N.Y." and "Detroit" are obtained from the ontology expansion processing with reference to FIG. 10. Also, from the topic network expansion processing, with reference to FIG. 3, "grand sale", "N.Y.", "theft", and the like are obtained from the topic network 302 which has the delivery source URL 201 "http://aaa" and the date and time of processing 301 "2009/01/22 00:00:00". Also, "Detroit", "illumination", "ramen", and the like are obtained from the topic network 302 which has the same delivery source URL 201 and a date and time of processing 301 one day before. Hence, as common relevant words Zs' of the tables T and S, "N.Y." and "Detroit" are obtained. That is, "L.A." and "N.Y." have a relevancy as shopping street names, and also have relevancies "grand sale" and "theft". Likewise, "L.A." and "Detroit" have a relevancy as shopping street names, and also have relevancies "illumination" and "ramen".

Next, it is determined in step S1102 whether or not subject keywords X to be processed having the common relevant words Zs' still remain. If such subject keywords X having the common relevant words Zs' remain, the process advances to step S1103; otherwise, since there are no common parts to the subject keywords, the stationarity determination processing ends without performing the subsequent processes.

In step S1103, a delivery source URL U corresponding to the subject keyword X to be processed is acquired. That is, the delivery source URL of documents used to create the topic network including the common relevant words Zs' is acquired from the keyword expansion unit 106.

It is determined in step S1104 whether or not relevant words Zs' to be processed still remain for the delivery source URL U acquired in step S1103. In this case, "to be processed" indicates that keywords, which are not the subject keywords X and common relevant words Zs' of those included in the topic network, do not undergo any processing. More specifically, it is determined whether or not there are relevant words Z' to be processed, which are not included in the table S generated by the ontology expansion unit 108, of the relevant word set Zs. For example, in FIG. 3, since "L.A." and "N.Y." are acquired as the common relevant words Zs' in association with the topic network 302 having the delivery source URL 201 "http://aaa" and the date and time of processing 301 "2009/01/22 00:00:00", "grand sale" and "theft" are selected as relevant words Z' to be processed, which are not included in the table S generated by the ontology expansion unit 108. If there are relevant words Z' to be processed, they are acquired, and the process proceeds to step S1105; otherwise, the process returns to step S1102 to repeat the processes in steps S1102 to S1104.

In step S1105, frequency distributions of appearance of the relevant words Z' with respect to the topic network of the delivery source URL U are calculated. However, since the frequency of appearance of such word in the topic network assumes only a value "0" or "1", that is, since such word may or may not appear in the topic network, it is often difficult to make determination in a test to be described later. Hence, frequencies of appearance of these words in documents used to create the topic network may be calculated. That is, the frequency distributions of appearance of the relevant words Z' may be calculated with reference to documents, which are used to extract keywords by the keyword extraction unit 105, from the external memory. Alternatively, the topic network storage 103 may store not only topic networks but also all documents from 101, which are used to create networks by the topicality determination unit 102, and the frequency distributions of appearance of the relevant words Z' may be calculated with reference to these documents.

In step S1106, differences (to be also referred to as distances hereinafter) between the frequency distributions of appearance of the relevant words Z' and uniform distributions are calculated. The distance calculation may use a method such as K-L divergence. As examples of the frequency distributions of appearance of the relevant words Z', those of the relevant words "grand sale", "illumination", and "theft" will be described below with reference to FIG. 12.

Assuming that a long-term appearance probability conforms to a uniform distribution as in the topicality determination processing in the topicality determination unit 102, a null hypothesis "an actual appearance frequency distribution conforms to a uniform distribution having the same average" is tested to determine a stationarity of a keyword. More specifically, for example, in case of FIG. 12, since (a) "grand sale" appears on average in all periods, distances between the frequencies of appearance and a uniform distribution at respective times are small. On the other hand, since the frequencies of appearance of (b) "illumination" and (c) "theft" are only locally plotted, and their uniform distributions become nearly zero, distances between the frequencies of occurrence and uniform distributions are large.

In step S1107, the stationarities are determined by checking whether or not the distances between the frequency distributions of appearance and uniform distributions, which are calculated in step S1106, are smaller than a threshold. If the distance is larger than the threshold, it is determined that a word appears unexpectedly(not stationarity); otherwise, it is determined that a word appears stationarity. For example, in case of FIG. 12, as for (a) "grand sale", since the distance between the appearance frequency distribution and uniform distribution is small, if it is less than or equal to the threshold, it is determined that the relevant word appears stationarity. As for (b) "illumination" and (c) "theft", since the distances between the frequency distributions of appearance and uniform distributions are large, if they are larger than the threshold, it is determined that the relevant words appear unexpectedly. After determination, the process returns to step S1101 to repeat the processes in steps S1101 to S1107 until processing for all subject keywords X is complete.

Figure 13:
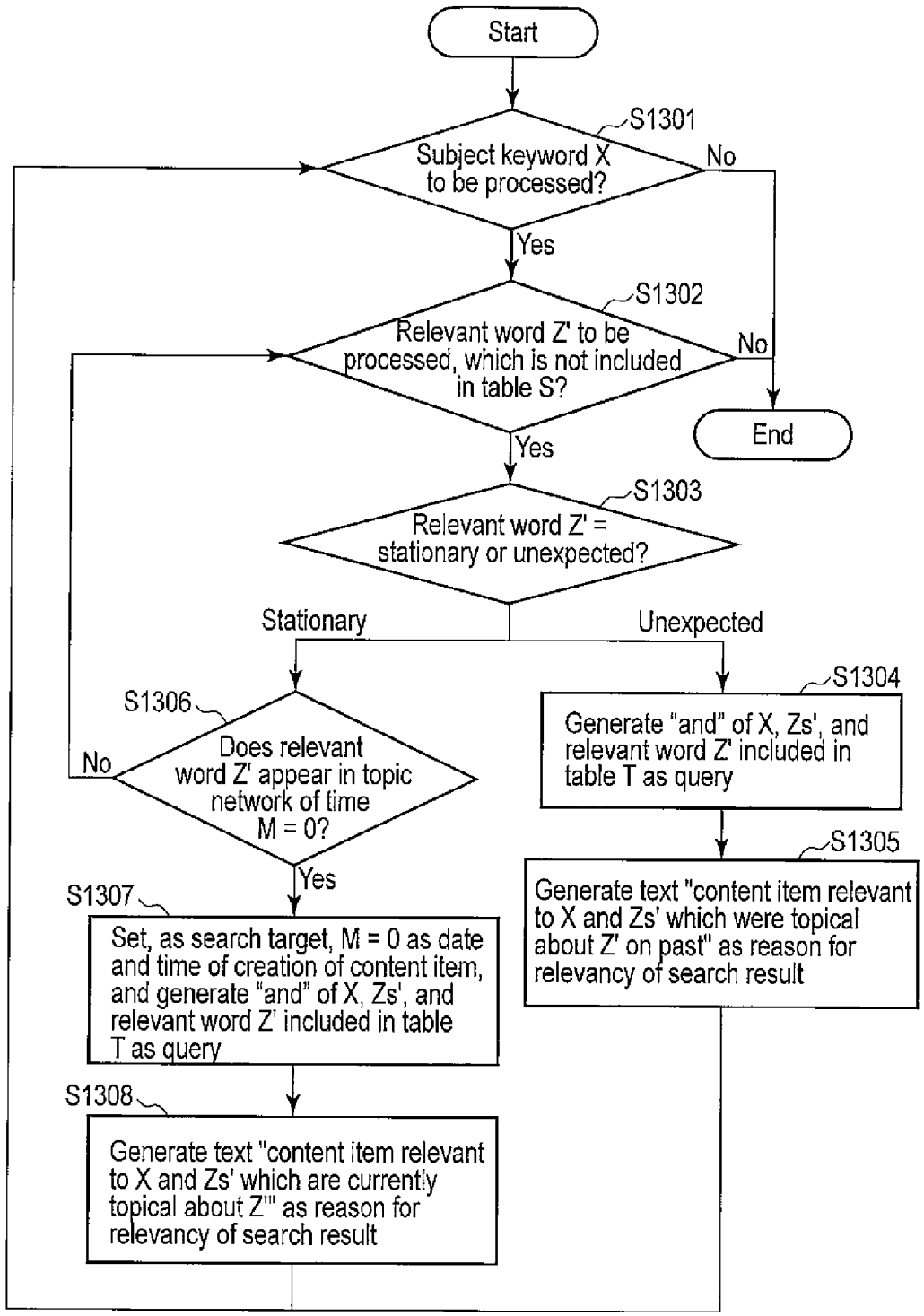
FIG. 13 is a flowchart illustrating an example of an operation of a query generation unit.

The query generation processing in the query generation unit 111 will be described in detail below with reference to the flowchart shown in FIG. 13. Relevant words which are determined to be stationary by the stationarity determination unit 110 are all-time events, and even when traced-back relevant content items are presented, the user hardly takes an interest in them. Conversely, relevant words which are determined to be unexpected are rare events, and the user may take an interest in them. Hence, it is significant to present traced-back relevant content items.

Initially, it is determined in step S1301 whether or not subject keywords X to be processed still remain. If subject keywords X to be processed still remain, one subject keyword X is acquired, and the process advances to step S1302. If no subject keyword X remains, the query generation processing ends.

Next, it is determined in step S1302 whether or not the common relevant words Zs' include relevant word Z' to be processed, which is not included in the table S. If such relevant words Z' are found, the process proceeds to step S1303; otherwise, the query generation processing ends.

It is then determined in step S1303 whether the relevant word Z' is unexpected or stationary. This determination process can be attained by referring to the processing result of the stationarity determination unit 110. If the relevant word Z' is unexpected, the process proceeds to step S1304; if the relevant word Z' is stationary, the process proceeds to step S1306.

In step S1304, "X and Zs' and Z'" as a combination of the relevant word Z', the original subject keyword X, and the common relevant word Zs' included in the table T is generated as a query character string, and is not added to a condition related to a time as a date and time of creation of a content item to be searched. This is to present all previous relevant content items since an unexpected event is more likely to attract the user's interest by itself. The relevant word Z' in this case indicates a keyword included in all the topic networks.

In step S1305, a reason for a relevancy is given to the query processing result in step S1304. For example, text "content items relevant to X and Zs' which were topical about Z' previously" is created. Then, the processing for the unexpected relevant word Z' is complete, and the process returns to step S1301 to repeat the same processes for subject keywords X to be processed.

It is determined in step S1306 whether or not the relevant word Z' which is determined to be stationary appears in the topic network at the time M=0, that is, at the latest date and time of processing. This is to prevent relevant content items traced back from the latest date and time of processing from presenting, since the stationary relevant word always appears from the past, and rarely attracts new user's interest unless that relevant word is a topic at the latest date and time of processing, and since it is insignificant to search for events older than the latest date and time of processing. If the relevant word Z' appears in the topic network at the latest date and time of processing, the process proceeds to step S1307. If the relevant word Z' does not appear in the topic network at the latest date and time of processing, the process returns to step S1302 without performing any query generation processing, thus repeating similar processes.

In step S1307, the time M=0 as a date and time of creation of a content item to be searched is added to a condition, and "X and Zs' and Z'" as a combination of the relevant word Z', the original subject keyword X, and the common relevant word Zs' included in the table T is generated as a query character string. The relevant word Z' in this case indicates all keywords included in the ontology.

In step S1308, a reason for a relevancy is given to the query processing result in step S1307. For example, text "content items relevant to X and Zs' which are topical about Z' currently" is created. Then, the processing for the stationary relevant word Z' is complete, and the process returns to step S1301 to repeat the same processes for subject keywords X to be processed.

In case of the examples shown in FIG. 12, since the relevant word "grand sale" which is determined to be stationary by the stationarity determination processing appears in the topic network at the time M=0, that is, at the latest date and time of processing, query generation processing is continued. For content items at the time M=0, a search is conducted using the query "L.A. and N.Y. and grand sale", and "content items relevant to L.A. and N.Y. which are currently topical about grand sale" is presented to the user as a reason for a relevancy. Note that in the reason for the relevancy, since "L.A." and "N.Y." have an ontology based relevancy "Shopping street name", it may be clearly specified to present "content items relevant to L.A. and N.Y. as shopping streets which are currently topical about grand sale".

On the other hand, in case of "illumination" and "theft" which are determined to be unexpected by the stationarity determination processing, a search is conducted using queries "L.A. and Detroit and illumination" and "L.A. and Detroit and theft" without adding any condition associated with a time, so as to present all previous relevant content items. As reasons for relevancies upon presenting content items of the search results, "content items relevant to L.A. and Detroit which were topical about illumination on past" and "content items relevant to L.A. and Detroit which were topical about theft on past" are presented to the user.

Figure 14:
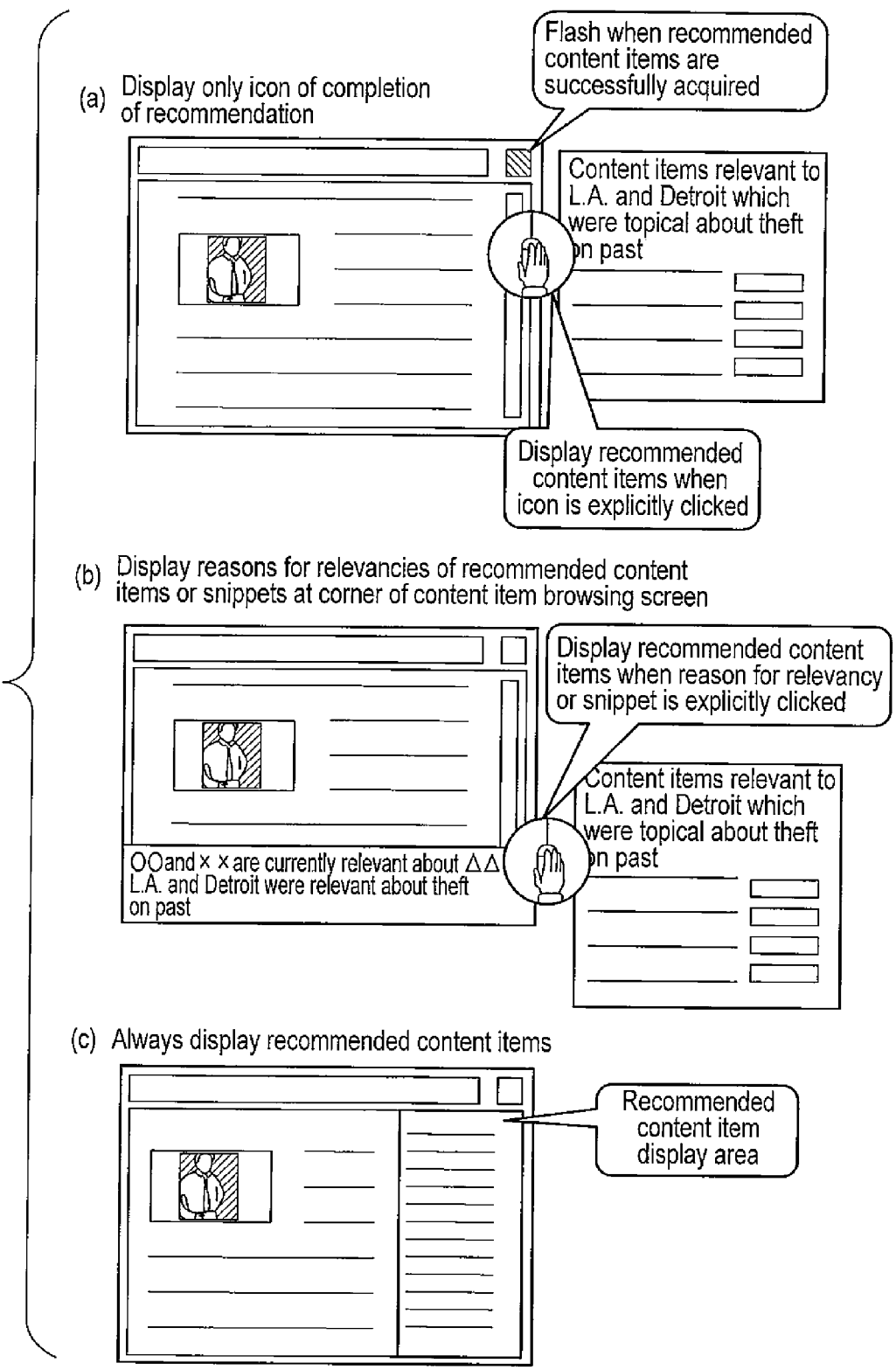
FIG. 14 illustrates examples of relevancy presentation in a content item presentation unit.

Finally, examples of a relevancy presentation method will be described in detail below with reference to FIG. 14. As shown in FIG. 14, three examples of the relevancy presentation method will be explained.

In FIG. 14(*a*), only an icon indicating completion of recommendations is displayed. For example, only when recommended content items are successfully acquired in correspondence with a subject keyword, the "recommendation completion" icon is displayed so as to recommend content items without disturbing user's content item viewing as much as possible. Then, only when the user explicitly clicks the icon, a recommendation screen is displayed.

In FIG. 14(*b*), reasons for relevancies of recommended content items or snippets are displayed at a corner of a content item browsing screen. Then, only when the user explicitly clicks them, a recommendation screen is displayed.

In FIG. 14(*c*), recommended content items are always displayed. Such display method is effective when the user wants to never miss recommended content items, and a display area of recommended content items is assured in advance to always display recommended content items.

These display methods may be set in advance by the user for the system, or may be automatically switched depending on types of devices used to browse content items or those of recommended content items. Note that the present embodiment is not limited to these presentation methods, and a method that allows the user to recognize relevancy presentations such as an audible notification may be used.

Furthermore, when it is determined that the relevant word Z' is unexpected, a query character string "Zs' and Z'", which does not include any subject keyword, may be generated, and "content item relevant to Zs' which was topical about Z' like X on past" may be displayed as a reason for a relevancy, so as to forcibly divert the user's interest. Normally, in this case, since the query character string does not include any subject keyword X, it is difficult for the user to recognize a relevancy with a currently browsed content item if he or she browses a search result content item. However, by presenting the reason for the relevancy according to this embodiment, a presentation that allows the user to easily recognize the relevancy can be realized.

According to the aforementioned embodiment, even for a keyword which represents an unexpected event with a less-visible relevancy, a reason for the relevancy is explicitly displayed, thus forcibly diverting the user's interest. Hence, appropriate query expansion and content items search with visible relevancies can be attained, thus realizing presentations with easy to understand relevancies.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A relevancy presentation apparatus, comprising a computer programmed to cause:
   a first storage to store a plurality of topic networks obtained by clustering first keywords related to topics based on a co-occurrence relation between the first keywords;
   a second storage to store at least one ontology indicating a network which hierarchically represents conceptual connections between second keywords and upper layers of which correspond to broader concepts, the second keywords indicating first nodes in the network;
   an extraction unit to extract, from one or more documents, one or more subject keywords each indicating a topic of a first content item, the documents each comprising at least one first content item, the subject keywords being included in the topic networks;
   a first expansion unit to acquire one or more first relevant words from the topic networks, the first relevant words indicating third keywords other than the subject keywords;
   a second expansion unit to search the ontology for the subject keywords, and, if the subject keywords are thereby found, to acquire in turn from successively higher layers, beginning with a first layer comprising the subject keywords, second nodes in each layer until the number of acquired second nodes has exceeded or reached a first threshold;
   a first determination unit to extract common relevant words indicating that the first relevant words and the acquired second nodes are common, and to determine whether or not frequencies of appearances of second relevant words are stationary, the second relevant words indicating fourth keywords which fail to be included in the acquired second nodes among the first keywords of the topic networks including the common relevant words; and
   a generation unit to generate search queries based on whether or not the frequencies of appearances are stationary, and to generate search results of second content items and a reason for a relevancy of the second content items.

2. The apparatus according to claim 1, wherein the first determination unit determines that each of the second relevant words is stationary if a distance between a frequency distribution of appearance of each second relevant word and a uniform distribution of the each second relevant word is not more than a second threshold, and the first determination unit determines that each of the second relevant words is not stationary if the distance is larger than the second threshold.

3. The apparatus according to claim 1, wherein the computer is further programmed to cause:
a collection unit to collect a document group having date and time information items of the documents; and
a second determination unit to determine topicalities by generating frequency distributions of appearances of the first keywords.

4. The apparatus according to claim 1, wherein the extraction unit extracts the subject keywords from one or more texts included in a plurality of first content items every time a user browses the plurality of first content items.

5. The apparatus according to claim 1, wherein, if the second relevant words are determined to be unexpected, the generation unit generates the search queries relate to the second relevant words by tracing back the topic networks including the second relevant words every period, the period indicating a difference between a generation time of a latest topic network and a generation time of a second latest topic network, and if the second relevant words are determined to be stationary, the generation unit generates the search queries only when the second relevant words are included in the latest topic network and presents the reasons together with retrieved content items, the latest topic network and the second latest topic network being stored in the first storage.

6. A relevancy presentation method, comprising:
storing in a first storage a plurality of topic networks obtained by clustering first keywords related to topics based on a co-occurrence relation between the first keywords;
storing in a second storage at least one ontology indicating a network which hierarchically represents conceptual connections between second keywords and upper layers of which correspond to broader concepts, the second keywords indicating first nodes in the network;
extracting, from one or more documents, one or more subject keywords each indicating a topic of a first content item, the documents each comprising at least one first content item, the subject keywords being included in the topic networks;
acquiring one or more first relevant words from the topic networks, the first relevant words indicating third keywords other than the subject keywords;
searching the ontology for the subject keywords, and, if the subject keyword are thereby found, acquiring in turn from successively higher layers, beginning with a first layer comprising the subject keywords, second nodes in each layer until the number of acquired second nodes is not less than a first threshold;
extracting common relevant words indicating that the first relevant words and the acquired second nodes are common, and determining whether or not frequencies of appearances of second relevant words are stationary, the second relevant words indicating fourth keywords which fail to be included in the acquired second nodes among the first keywords of the topic networks including the common relevant words; and
generating search queries based on whether or not the frequencies of appearances are stationary, and to generate search results of second content items and a reason for a relevancy of the second content items.

7. The method according to claim 6, wherein the determining the search queries determines that each of the second relevant words is stationary if a distance between a frequency distribution of appearance of each second relevant word and a uniform distribution of the each second relevant word is not more than a second threshold, and the determining the search queries determines that each of the second relevant words is not stationary if the distance is larger than the second threshold.

8. The method according to claim 6, further comprising:
collecting a document group having date and time information items of the documents; and
determining topicalities by generating frequency distributions of appearances of the first keywords.

9. The method according to claim 6, wherein the extracting the subject keywords extracts the subject keywords from one or more texts included in a plurality of first content items every time a user browses the plurality of first content items.

10. The method according to claim 6, wherein, if the second relevant words are determined to be unexpected, the generating the search queries generates the search queries relate to the second relevant words by tracing back the topic networks including the second relevant words every period, the period indicating a difference between a generation time of a latest topic network and a generation time of a second latest topic network, and if the second relevant words are determined to be stationary, the generating the search queries generates the search queries only when the second relevant words are included in the latest topic network and presents the reasons together with retrieved content items, the latest topic network and the second latest topic network being stored in the first storage.

11. A non-transitory computer readable medium including computer executable instructions, wherein the instructions, when executed by a processor, cause the processor to perform a method comprising:
storing in a first storage a plurality of topic networks obtained by clustering first keywords related to topics based on a co-occurrence relation between the first keywords;
storing in a second storage at least one ontology indicating a network which hierarchically represents conceptual connections between second keywords and upper layers of which correspond to broader concepts, the second keywords indicating first nodes in the network;
extracting, from one or more documents, one or more subject keywords each indicating a topic of a first content item, the documents each comprising at least one first content item, the subject keywords being included in the topic networks;
acquiring one or more first relevant words from the topic networks, the first relevant words indicating third keywords other than the subject keywords;
searching the ontology for the subject keywords, and, if the subject keyword are thereby found, acquiring in turn from successively higher layers, beginning with a first layer comprising the subject keywords, second nodes in each layer until the number of acquired second nodes is not less than a first threshold;
extracting common relevant words indicating that the first relevant words and the acquired second nodes are common, and determining whether or not frequencies of appearances of second relevant words are stationary, the second relevant words indicating fourth keywords which fail to be included in the acquired second nodes among the first keywords of the topic networks including the common relevant words; and
generating search queries based on whether or not the frequencies of appearances are stationary, and to generate search results of second content items and a reason for a relevancy of the second content items.

12. The computer readable medium according to claim 11, wherein the determining the search queries determines that each of the second relevant words is stationary if a distance between a frequency distribution of appearance of each second relevant word and a uniform distribution of the each second relevant word is not more than a second threshold, and the determining the search queries determines that each of the second relevant words is not stationary if the distance is larger than the second threshold.

13. The computer readable medium according to claim 11, further comprising:
   collecting a document group having date and time information items of the documents; and
   determining topicalities by generating frequency distributions of appearances of the first keywords.

14. The computer readable medium according to claim 11, wherein the extracting the subject keywords extracts the subject keywords from one or more texts included in a plurality of first content items every time a user browses the plurality of first content items.

15. The computer readable medium according to claim 11, wherein, if the second relevant words are determined to be unexpected, the generating the search queries generates the search queries relate to the second relevant words by tracing back the topic networks including the second relevant words every period, the period indicating a difference between a generation time of a latest topic network and a generation time of a second latest topic network, and if the second relevant words are determined to be stationary, the generating the search queries generates the search queries only when the second relevant words are included in the latest topic network and presents the reasons together with retrieved content items, the latest topic network and the second latest topic network being stored in the first storage.

* * * * *